C. G. E. HENNIG.

TRICYCLE.

No. 10,575. Reissued Mar. 24, 1885.

WITNESSES:

John E. Deemer

C. Sedgwick

INVENTOR:

C. G. E. Hennig

BY Munn & Co.

ATTORNEYS.

N. PETERS, Photo-Lithographer, Washington, D. C.

UNITED STATES PATENT OFFICE.

CARL G. E. HENNIG, OF PATERSON, NEW JERSEY.

TRICYCLE.

SPECIFICATION forming part of Reissued Letters Patent No. 10,575, dated March 24, 1885.

Original No. 310,998, dated January 20, 1885. Application for reissue filed February 7, 1885.

*To all whom it may concern:*

Be it known that I, CARL G. E. HENNIG, of Paterson, in the county of Passaic and State of New Jersey, have invented a new and useful Improvement in Tricycles, of which the following is a full, clear, and exact description.

This invention pertains to improvements in tricycles; and it consists of the combinations of parts and their construction, substantially as hereinafter fully set forth and claimed.

Reference is to be had to the accompanying drawings, forming part of this specification, in which similar letters of reference indicate corresponding parts in all the figures.

Figure 1:
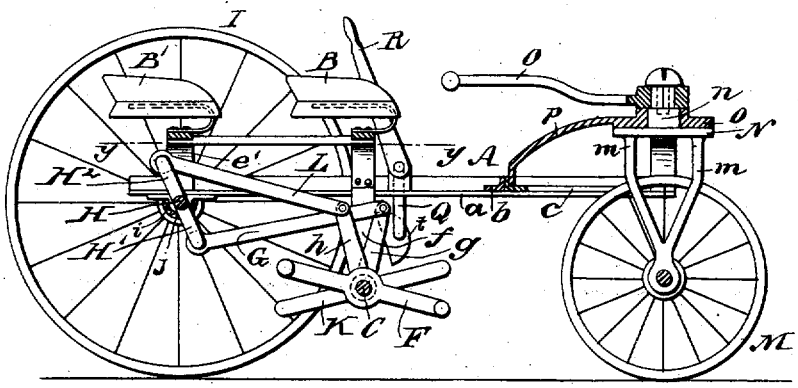
Figure 2:
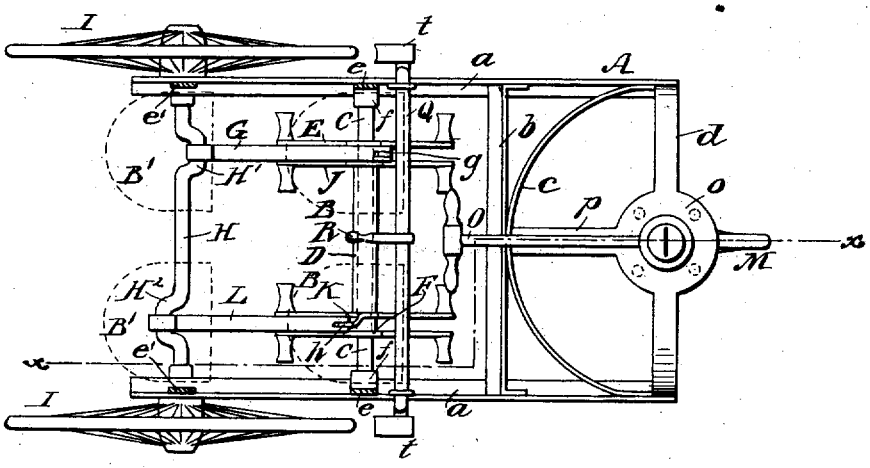
Figure 4:
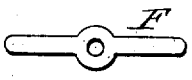
Figure 3:
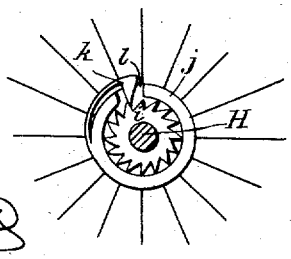
Figure 5:
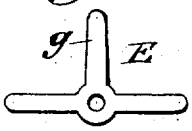

Figure 1 is a sectional side elevation of my invention, taken on the line *x x*, Fig. 2. Fig. 2 is a sectional plan view taken on the line *y y* of Fig. 1, the seats being shown in dotted lines. Fig. 3 is a detailed sectional view of a part of one of the drive-wheels, showing its ratchet-connection to the axle; and Figs. 4 and 5 show the preferred form of treadles used.

The main frame A may be of any desired construction. In this instance it is composed of the side bars, *a a*, cross-piece *b*, curved brace *c*, upwardly-curved front cross-piece, *d*, and upwardly-curved front and back seat-supports, *e e'*, upon which the front and back seats, B B', are supported, as shown clearly in Fig. 1.

C is a rock-shaft, journaled in the arms *f f*, that depend from the side bars, *a a*. This shaft C in this instance is arranged immediately under the front seats, B, and on it is placed loosely the tube D, that is confined from endwise movement by the treadles E F, fixed upon the shaft C. The treadle F is centrally secured upon the shaft C, and constitutes a double treadle, one portion standing in front of the other in the rear of the shaft C. The treadle E is also centrally secured upon the shaft C, to constitute a double treadle, and it is provided with the upwardly-projecting arm *g*, which is connected by the connection-rod G to the crank H' of the double-crank axle H, which latter supports the rear end of the frame A, and has the drive-wheels I I journaled upon its ends. The tube D has the treadles J K secured to its opposite ends. The treadle J, like the treadle F, is a plain double treadle, while the treadle K is, like the treadle E, formed with an upwardly-projecting arm, *h*, which is connected by the connecting-rod L to the crank $H^2$ of the crank-axle H. The double treadles E F, which are secured to the rock-shaft C, are working with each other. The treadle F is a plain double treadle, and when worked assists the double treadle E, which is provided with a rocker-arm, *g*, which is connected with rod G to crank H'. The double treadles J K are secured to the tube D. The treadle J is a plain double treadle, and when worked assists the double treadle K, which is provided with a rocker-arm, *h*, and connected with rod L to crank $H^2$. The ends of the treadles E J which point forward constitute one pair of treadles, which are convenient to the front seat, B, on the left-hand side of the tricycle. The ends of the same double treadles E J which point backward constitute one pair of treadles for the back seat, B', on the same side. The treadles K F are arranged in the same manner to the seats B B' on the right-hand side of the tricycle as E J are on the left-hand side of the same, so that persons riding on the seats may apply their feet to the pedals on the ends of the pairs of treadles, and work them alternately up and down, which will rotarily reciprocate the shaft C and tube D, the latter turning on the shaft C, and alternately rock or reciprocate the arms *g h*, which, through rods G L and cranks H' $H^2$, will cause the axle H and wheels I I to revolve, and thus propel the tricycle. The double-crank axle H is formed or provided near each end with a ratchet-wheel, *i*, and the hub *j* of each wheel I is provided with a spring-pawl, *k*, which reaches through an opening, *l*, in the hub *j*, and engages with the teeth of its respective ratchet-wheel *i*, so that the wheels I are held to the shaft H only by the pawls *k* when the tricycle is propelled forward, the wheels being free to turn forward independently of the axle. In this manner the wheels I and the axle are relieved of all lateral strain in turning the tricycle, since the ratchets will permit the axle to turn in the wheel having the greater distance to cover. The guide-wheel M is journaled between the braces *m m*, secured to the circular plate N, which constitutes the fifth-wheel. The fifth-wheel or plate N is formed with the hub *n*, which is journaled in an opening made in the central enlarged portion, *o*, of the upwardly-curved front cross-piece, *d*, and to the upper end of the hub *n* is secured the horizontal lever O, by which the wheel M may be turned for guiding the tricycle. The enlarged portion *o* of the front cross-piece, *d*, is of about the same size as the fifth-wheel or plate N, and the cross-piece *d* is braced from the central portion, *o*, to the curved brace *c* by the brace *p*, so that the cross-piece *d* is held very firm, and owing to the enlarged portion *o*, plate N and brace *m* hold the wheel M in a very firm and secure manner, so that the front portion of the tricycle may be made comparatively light, and still possess sufficient strength and rigidity for all ordinary uses of the tricycle. A brake, Q, is provided, which may be operated by the lever R for bringing the shoes *t t* thereof against the wheels I, for controlling the speed of the tricycle in going down grade.

Having thus described my invention, I claim as new and desire to secure by Letters Patent—

1. The combination, with four pairs of treadles, of two rocking arms, *g h*, connected to the cranks of the axle by rods G L, two pairs of said treadles being connected to the shaft C, and the two other pairs of said treadles being connected to a tube, D, arranged upon said shaft C, substantially as described.

2. The shaft C, having treadles secured thereto, in combination with a tube placed upon a shaft, and provided with treadles, the shaft and tube being connected with the crank-axle by rocking arms and connecting-rods, substantially as described.

3. The shaft C, provided with the double treadles E F, in combination with the tube D, provided with the double treadles J K, and the treadles E K, having the rocker-arms *g h*, connected to the axle H, substantially as described.

4. The cross-piece *d* of the frame of the tricycle, enlarged at *o* and braced by the rod *p*, in combination with the circular plate N, formed with hub *n*, and provided with the braces *m*, between which the guide-wheel M is held, substantially as described.

CARL G. E. HENNIG.

Witnesses:

H. A. WEST,

C. SEDGWICK.